(12) United States Patent
Torizuka et al.

(10) Patent No.: US 8,070,888 B2
(45) Date of Patent: Dec. 6, 2011

(54) HIGH STRENGTH FORMED ARTICLE COMPRISING HYPERFINE GRAIN STRUCTURE STEEL AND MANUFACTURING METHOD OF THE SAME

(75) Inventors: Shiro Torizuka, Ibaraki (JP); Eijrio Muramatsu, Ibaraki (JP); Kotobu Nagai, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 1023 days.

(21) Appl. No.: 11/884,948

(22) PCT Filed: Feb. 28, 2006

(86) PCT No.: PCT/JP2006/003797
§ 371 (c)(1),
(2), (4) Date: Nov. 30, 2007

(87) PCT Pub. No.: WO2006/093167
PCT Pub. Date: Sep. 8, 2006

(65) Prior Publication Data
US 2008/0135140 A1    Jun. 12, 2008

(30) Foreign Application Priority Data
Feb. 28, 2005 (JP) ................................. 2005-054261

(51) Int. Cl.
*C22C 38/04* (2006.01)
(52) U.S. Cl. ........ 148/320; 148/598; 148/599; 148/595; 411/424; 411/403
(58) Field of Classification Search .................. 148/587, 148/320
See application file for complete search history.

(56) References Cited

U.S. PATENT DOCUMENTS 4,466,842 A * 8/1984 Yada et al. .................... 148/564
4,874,644 A * 10/1989 Fergison ....................... 428/636
2004/0112484 A1 * 6/2004 Saito et al. .................... 148/638

FOREIGN PATENT DOCUMENTS
EP    1 559 804    8/2005
(Continued)

OTHER PUBLICATIONS

Machine translation of JP2004-060046 (Japanese document published Feb. 26, 2004).*

(Continued)

*Primary Examiner* — Roy King
*Assistant Examiner* — Christopher Kessler
(74) *Attorney, Agent, or Firm* — Wenderoth, Lind & Ponack, L.L.P.

(57) ABSTRACT

A wire rod or a steel wire of a bamboo nano-structure, whose mean grain diameter in a C-direction section is 200 nm or smaller, is prepared by applying a hot or warm working and additionally applying a cold working to a steel and next, by performing a forging, by a tool or a die such as cold pressure production, to a section, of a desired, limited site, other than a section parallel to an L-direction, an equiaxed nano-structure, whose mean grain diameter is 200 nm or smaller, is formed in this site. As a typical example of a formed article, there is enumerated a high strength micro screw in which a shaft outer diameter is 1.6 mm or smaller, a surface layer part of a head part recess has equiaxed nano-structure and a hardness $H_v \geq 300$, and a screw main body portion has bamboo nano-structure and a hardness $H_v \geq 250$.

4 Claims, 7 Drawing Sheets

FOREIGN PATENT DOCUMENTS

| | | |
|---|---|---|
| EP | 1580291 A1 * | 9/2005 |
| JP | 2004-060046 | 2/2004 |
| JP | 2005-194550 | 7/2005 |
| JP | 2005-320630 | 11/2005 |

OTHER PUBLICATIONS

Toshiyuki Watanabe, "Kikai-yo Kouzou-yo Kou", Nihon Tekko Kyoukai, pp. 46 and 97.

* cited by examiner

HIGH STRENGTH FORMED ARTICLE COMPRISING HYPERFINE GRAIN STRUCTURE STEEL AND MANUFACTURING METHOD OF THE SAME

TECHNICAL FIELD

The invention of the present application is one relating to a tough formed article whose main body is constituted by a fine bamboo structure and in which a fine equiaxed structure is formed in a position of desired one part of this main body, and a technique manufacturing the same.

BACKGROUND ART

In regard to a formed article represented by a fastening component, such as a bolt and a screw, used in various products extending from a precision large machine such as automobiles and air craft to a small precision equipment such as various electric appliances and information equipment, a greater toughness and a greater increase in life are demanded from viewpoints of safety, convenience and compactification of the product, or the like. Moreover, about a manufacturing process of the formed article, it is also an important requirement to reduce a load to environment.

Hitherto, in regard to the toughening of a steel-made component, it is achieved by optimizing mainly an alloy constituent, and conditions of a working and a heat treatment. In regard to this, recently, there is studied a manufacturing technique of the formed article, in which an energy conservation, a conservation of natural resources, and a reduction in environment load become possible. For example, in JP-A-2004-60046 (hereafter, referred to as Patent Document 1), there are proposed a high strength formed article including a screw and the bolt, and a manufacturing method of the same, i.e., the high strength formed article whose strength is ensured by forming a hyperfine structure, e.g., a pressure-produced article, and various components and members, without depending on an addition of alloy element or a refining treatment, and the method capable of simply manufacturing that high strength formed article. That is, according to the Patent Document 1, there is disclosed the high strength formed article in which a wire rod whose mean grain diameter in short diameter is 0.5 μm in minimum is header-formed, and which is worked to a small screw or the bolt or a rivet by being form-rolled (refer to, e.g., paragraph number 0018, Table 2, Table 3 in the same Patent Document).

Patent Document 1: JP-A-2004-60046 However, in the same Patent Document, the mean grain diameter of the formed article is 0.5 μm even in minimum, and a tensile strength TS is 843 MPa even in maximum. And, especially, about a structure form and a strength as to a cold pressure-produced part in a head part of the wire rod made hyperfine grains to 0.5 μm in the mean grain diameter, there is neither description nor suggestion. Accordingly, in regard to the formed article in which a strength in a site, to which the cold pressure production is applied, is especially emphasized, and a strength higher than a level disclosed in the same Patent Document is demanded in a formed article main body, it is impossible to cope with it.

SUMMARY OF INVENTION

As mentioned above, even with the Patent Document 1, it is difficult to obtain a formed article in which a strength of its desired, limited site is additionally, more highly strengthened than the strength of the main body by differentiating the strength of the desired site of the formed article main body.

Whereupon, an object of the invention of the present application is to provide a formed article in which the strength of the formed article main body is higher than the strength level obtained by the Patent Document 1, i.e., higher than 850 MPa level, and moreover the strength of the desired, limited site has a strength of an additionally, more higher level than that main body, and a manufacturing technique of the same.

In order to solve the above problem, the inventors of the present application earnestly, repeatedly performed studies. As a result, the following knowledges were obtained.
[First Knowledge]

The inventors of the present application newly knew the fact that a steel wire or a steel bar obtained by a warm rolling and comprising a hyperfine grain structure steel having a ferrite grain diameter finely grained to a degree of 0.5 μm to 2 μm was excellent in its tensile strength TS and, at the same time, possessed an excellent high level in its reduction of area RA among ductility characteristics, which was not recognized hitherto.

Figure 1:
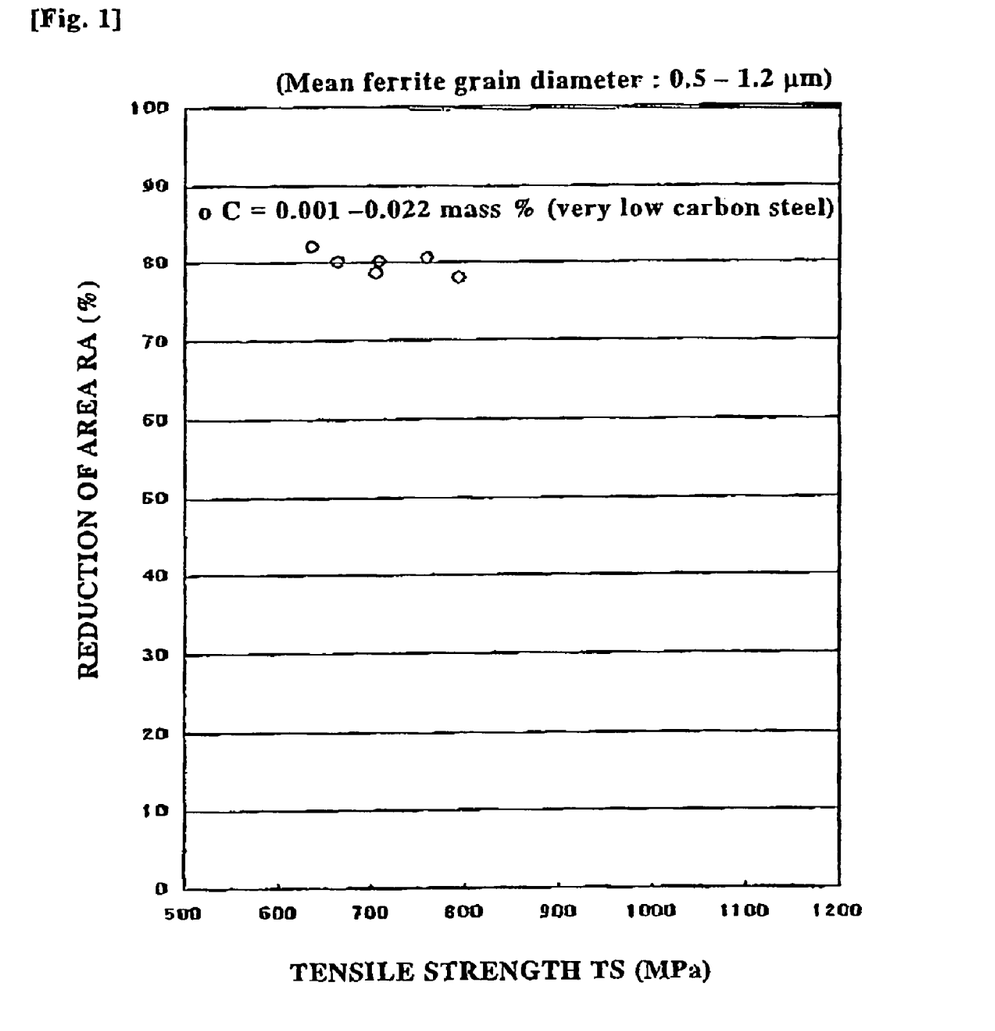
[FIG. 1] It is a graph exemplifying an excellent balance of a strength-ductility in a warm-rolled material having a mean grain diameter of a ferrite of a sub-micron degree, in a first knowledge which became a basis of the invention of the present application.

As a concrete example, in the above warm-rolled material having a carbon steel constituent whose C content is 0.001-0.02 mass %, as to mechanical properties of the steel bar having a structure whose main phase is ferrite in a range of 0.5 μm to 1.2 μm in the mean grain diameter of the ferrite in a section perpendicular to a rolling direction, as shown in FIG. 1, the reduction of area RA is secured to 70% or more even in a high level of 800-960 MPa in the tensile strength TS even if no heat treatment is applied at all after the warm rolling. Here, the structure whose main phase is ferrite means a structure in which a second phase may exist as the balance, or only the ferrite may exist without the second phase exists.
[Second Knowledge]

As a result of the fact that there were tested relations between a total area reduction rate of a cold working in a manufacturing process of a steel wire and the tensile strength TS as well as the reduction of area RA of the steel wire, there was newly known the fact that, in a stage of a wire rod having the high tensile strength TS and the high reduction of area RA characteristics obtained by the warm working method obtained by the above first knowledge, by making the fine grain structure steel in which a ferrite grain is at least 3 μm or smaller in the mean grain diameter in a section perpendicular to a longitudinal direction of the wire rod and applying a predetermined cold working to such a wire rod, a crystal structure was more fined and, even if the tensile strength TS of a material increased more remarkably following upon the fact that the structure was fined by this cold working and moreover the tensile strength increased remarkably, a lowering quantity of the reduction of area RA, which was in a high level, was suppressed extremely small even if this cold working was added.

Figure 2:
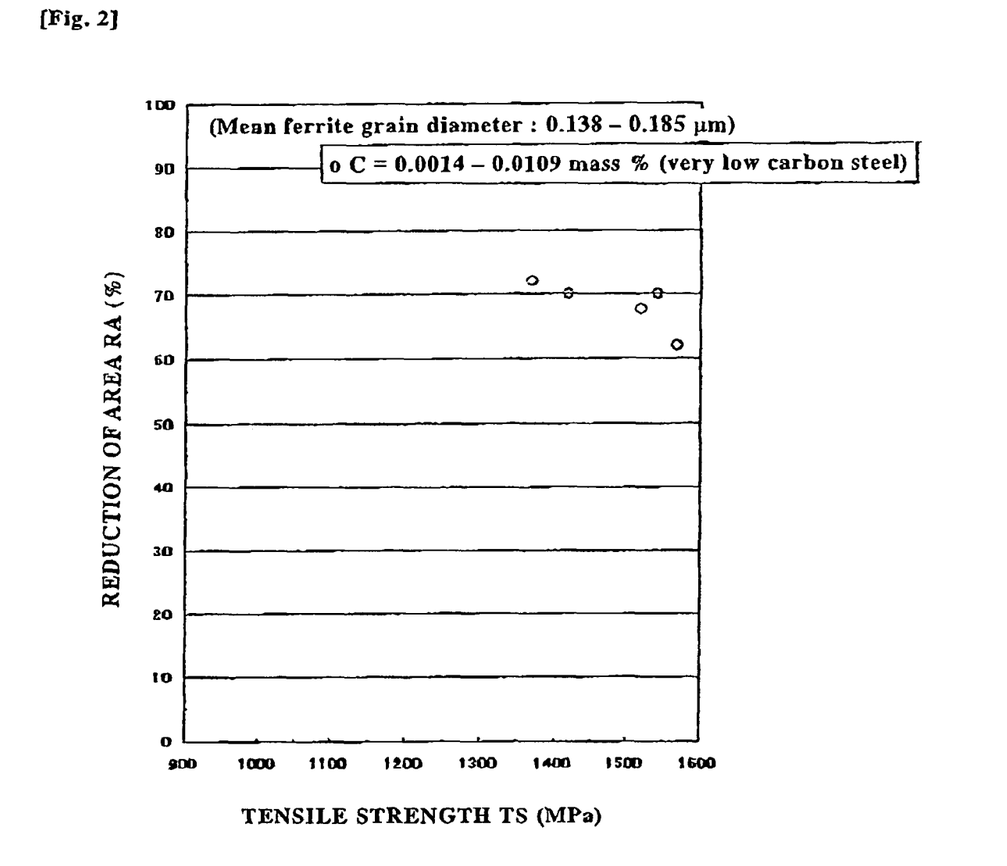
[FIG. 2] It is a graph exemplifying the excellent balance of the strength-ductility in a material having a hyperfine ferrite grain of 0.2 μm or smaller, which is obtained by combining a warm rolling and a cold rolling performed next, in a second knowledge which .became the basis of the invention of the present application.

As a concrete example, in a case where a warm rolling is performed to a material of a carbon steel constituent whose C content is 0.0014-0.0109 mass % and subsequently a cold wire drawing is applied, as to a mechanical property of the steel wire whose mean grain diameter of the ferrite in the section perpendicular to a rolling direction of the subjected steel wire is grain-fined into a range of 0.138 μm to 0.175 μm, and to which the hyperfine grains are given in this manner, as shown in FIG. 2, between the tensile strength TS and the reduction of area RA there is obtained such an extremely excellent balance characteristic that the reduction of area RA is 71.8-62.1% at a level in which the tensile strength TS is 1370-1521 MPa even if no beat treatment is applied at all after the cold wire drawing.

And, the above result in FIG. 2 is a case of a very low carbon steel whose C content is 0.0014-0.0109 mass %, and its metal structure is substantially a cementite-free case.

Like the above, from the first knowledge and the second knowledge, there is understood the fact that a steel material having a high tensile strength TS and having a high reduction of area RA is obtained by preparing a fine grain structure steel whose main body is the ferrite of the grain diameter of a sub-micron order by applying the warm rolling to a predetermined material to thereby manufacture a hyperfine grain structure steel additionally grain-fined by applying the cold working to the fine grain structure steel.

[Third Knowledge]

A third knowledge is as follows. Generally, as to a ferrite grain of a cold-worked material, by such a matter that a new crystal boundary is formed with a crystal grain being divided, a form of the grain after the cold working is complicated. In a case where the crystal grain is larger than about 10 µm, the crystal grain is divided and a new crystal boundary occurs. In regard to this, as a result of earnestly, repeatedly performing tests and studies, the inventors of the present application found out such a law that, in a case where a material before the cold working is a material after such a warm working as mentioned in the above first knowledge and a crystal grain diameter becomes the sub-micron order, if a strong cold working is applied to this, a shape of the crystal grain is deformed while depending on a simple, approximate geometrical deformation from that material to a material (steel material) after applied with a strong cold working, and thus the crystal grain does not grow.

And, additionally a next fourth knowledge was obtained.

[Fourth Knowledge]

The fourth knowledge is as follows. Although a crystal structure of the material after the cold working, which is obtained in the above second or third knowledge, exhibits a hyperfine grain bamboo structure, there was understood the fact that, in regard to a material constituted by this hyperfine grain bamboo structure, if a cold forging working was applied to a section substantially perpendicular to a longitudinal direction of this bamboo structure or a section not parallel to that longitudinal direction, an equiaxed nano-structure is formed in a surface layer part of this worked region. There was discovered the fact that a mean crystal grain diameter of this equiaxed nano-structure part was approximately the same degree as an original mean crystal grain diameter in a C-direction section, and its hardness was remarkably raised. Concretely, when an upsetting rate is 60-70%, one in which a Vickers hardness $H_v$ was a level of 250-280 in the bamboo structure rises to about 300-390 in the equiaxed structure part. In this equiaxed nano-structure part, an anisotropy in the mechanical property or the like, which is seen in the above bamboo structure part of the hyperfine grain, is remarkably improved. The present knowledge has a very important meaning in the invention of the present application.

Incidentally, the bamboo structure means, as normally used, a metal structure in which a crystal boundary between metal grains forms a shape like a bamboo extending in a direction perpendicular to a working direction. Further, the crystal grain of the equiaxed structure part (hereafter, referred to as "equiaxed crystal grain") means one in which a ratio ($\gamma$) between the grain diameter in the working direction and the grain diameter in a direction perpendicular to the working direction is lower than about 5:1, and a linear shape parallel to the working direction, which is like the crystal grain of the bamboo structure, is clearly vanished. Incidentally, a value of the y decreases by an increase in a working ratio.

The invention of the present application is one made on the basis of the above first to fourth knowledges and, especially in regard to a completion of the invention of the present application, the fourth knowledge is a greatest decisive factor. Gists of the invention of the present application are as follows.

A first invention is a high strength formed article comprising a hyperfine grain structure steel, and one having a characteristic in the fact that an equiaxed structure is formed in one part region of this formed article, a mean grain diameter in the region, in which the equiaxed structure is formed, is 200 nm or smaller, a bamboo structure is formed in a balance region, and a mean grain diameter of a section structure perpendicular to a longitudinal direction of the region, in which the bamboo structure is formed, also becomes 200 nm or smaller.

Here, "region, in which the equiaxed structure is formed," indicates a region in which the above-mentioned equiaxed structure is formed, and "mean grain diameter" in this region indicates a mean grain diameter in a section structure in an arbitrary direction.

Incidentally, in the invention of the present application, "formed article" indicates a screw, a bolt, a nut, a shaft, a rivet, a pin, a stud bolt, fasteners, a gear wheel, axles, a spring and other machine construction component (refer to *Kikai-yo Kouzou-y Kou*, P 46, P 97, issued by Nihon Tekko Kyoukai, written by Toshiyuki Watanabe).

A second invention is one having a characteristic in the fact that, in a high strength formed article comprising a hyperfine grain structure steel of the first invention, a hardness of the region, in which the equiaxed structure is formed, becomes 300 or higher in a Vickers hardness, and a hardness of the region, in which the bamboo structure is formed, becomes 230 or higher.

A third invention is one having a characteristic in the fact that, in a high strength formed article, comprising a hyperfine grain structure steel of the first invention, it is more highly strengthened than in the second invention, and a hardness of the region, in which the equiaxed structure is formed, becomes 350 or higher in a Vickers hardness, and a hardness of the region, in which the bamboo structure is formed, becomes 250 or higher.

A fourth invention is one having a characteristic in the fact that, in a high strength formed article comprising a hyperfine grain structure steel of any of the first to third inventions, the formed article is a screw component.

And, a fifth invention is one having a characteristic in the fact that, in a high strength formed article comprising a hyperfine grain structure steel of the fourth invention, the screw component is formed in its head part with a recess, in regard to a structure of a surface layer part of a bottom part of the recess it becomes the equiaxed structure whose mean grain diameter becomes 200 nm or smaller, and in regard to a structure of a shaft part of the screw component it becomes the bamboo structure whose mean grain diameter in a section structure perpendicular to a longitudinal direction of the shaft part becomes 200 nm or smaller.

And additionally, a sixth invention is one having a characteristic in the fact that, in a high strength formed article comprising a hyperfine grain structure steel of the fifth invention, the screw is such a so-called micro screw that its nominal diameter is 1.4 mm or smaller.

A seventh invention is one having a characteristic in the fact that a high strength formed article comprising a hyperfine grain structure steel according to any of the first to the sixth contains, as its chemical constituent composition, C: less than 0.2 mass %,
Si: less than 0.50 mass %, Mn: 0.50 mass % or less, and Al: 0.002-0.05 mass %, and the balance comprises Fe and inevitable impurities.

Hereunder, inventions of an eighth to an eleventh are inventions relating to a manufacturing method of a high strength formed article comprising a hyperfine grain structure steel.

An eighth invention is a manufacturing method of a high strength formed article comprising a hyperfine grain structure steel, which has a characteristic in the fact that the formed article is manufactured by a formation process including a process of preparing—by first applying a hot working or a warm working to any of a steel ingot, a cast piece, a steel piece or a steel material semi-finished product, and subsequently applying a cold working or the cold working and a heat treatment to a material obtained—a wire rod or a steel wire having a bamboo structure in which a mean grain diameter in a section structure perpendicular to a direction of the cold working is grain-fined to 200 nm or smaller, and subsequently applying, by using the wire rod or steel wire obtained and with this being made a raw material, a forging working to a section excluding a section parallel to a longitudinal direction of the wire rod or the steel wire by a tool or a metal die.

A ninth invention is one having a characteristic in the fact that, in a manufacturing method of a high strength formed article comprising a hyperfine grain structure steel of the eighth invention, an upsetting rate of the forging working performed in the formation process is made 50% or more A tenth invention is one having a characteristic in the fact that, in a manufacturing method of a high strength formed article comprising a hyperfine grain structure steel of the ninth invention, the formation process is a formation process of a screw component, and a formation process including a process of applying, as the forging working, a cold pressure production to the wire rod or the steel wire in order to form a recess in a head part of the screw component.

An eleventh invention is one having a characteristic in the fact that, in a manufacturing method of a high strength formed article comprising a hyperfine grain structure steel of the tenth invention, by the cold pressure production, the equiaxed structure whose mean grain diameter is 200 nm or smaller is formed in a surface layer part of a bottom face of the recess.

A twelfth invention is characterized in that a local upsetting rate (Xp) in a recess working is made 95% or more.

A thirteenth invention is characterized in that a local plastic strain (ε) in the recess working is made 3.0 or more.

A fourteenth invention is characterized in that a ratio (R) between a depth ($L_{top}$) from an upper surface of a screw head part to a deepest point of the bottom face of the recess and a thickness (h) of the screw head part in the recess working is made so as to become $$R = L_{top}/h \geq 2.5.$$

DETAILED DESCRIPTION OF THE INVENTION

The invention of the present application is one having the constitution and the characteristic relating to it, which are as mentioned above. Next, there are mentioned about reasons for defining an implementation mode of the invention of the present application and a mode in this implementation mode.
(1) Coexistence of Bamboo Nano-Structure and Equiaxed Nano-Structure The main body of the formed article is one in which a ductility is ensured and, at the same time, an isotropy of the mechanical property is raised by forming the bamboo nano-structure, and more raising the strength as to one part region of the formed article possessing a high strength and a high ductility by forming the equiaxed nano-structure in a desired one region. On that occasion, as to the crystal grain diameter of the bamboo structure, by the fact that the mean grain diameter of a section structure perpendicular to the longitudinal direction is made 200 nm or smaller, the tensile strength TS is raised to about 1200 MPa, and the reduction of area RA is maintained to about 70%. By an excellent strength-ductility balance like this, there is brought about a strong toughness effect. For example, in a case where the formed article is the screwy, a fracture torque value in a torsion test becomes excellent one.

The above-mentioned bamboo nano-structure is obtained in a case where a suitable cold working is applied to a fine crystal grain structure steel of the sub-micron order, which is obtained by suitable conditions of the warm rolling or a hot rolling. Here, as the suitable conditions of the warm rolling or the hot rolling, there suffices if a multi-direction multi-pass warm rolling is performed in a range of 350-800° C., desirably 400-600° C., in a rolling temperature, and in at least 50% in the total area reduction rate, desirably in at least 70% in the total area reduction rate, to thereby prepare a wire rod of the fine crystal grain structure of the sub-micron order, and subsequently to this wire rod there is applied a cold wire drawing or a cold working comprising the cold wire drawing and a cold rolling, or a heat treatment for the cold working and softening.

By doing like this, there is obtained a material having such an ultra-grain-fined bamboo nano-structure that the mean grain diameter in the section in a direction perpendicular to the cold working direction is 200 nm or smaller.

Incidentally, as a method of measuring the grain diameter in the nano-structure, it can be found, e.g., by an image processing of a TEM (Transmission Electron Microscopy) image, although not limited especially to this.

On the other hand, as to the equiaxed nano-structure, in a case where the mean grain diameter of the bamboo nano-structure is 200 nm or smaller, which is obtained by doing like the above, in the section in the direction perpendicular to the longitudinal direction, it can be formed by applying a forging working to it. On that occasion, as to a direction of the forging working, it is necessary that the working is performed in a direction not becoming parallel to the bamboo longitudinal direction of the bamboo nano-structure. As an example working to the formed article from the steel wire or the wire rod of the bamboo nano-structure like this, there is taken up a case forming the screw.

The steel wire cut to a predetermined length is formed to a preliminary formed article by performing a primary formation including a head part, and subsequently it is intermediately formed to an external shape of the screw and there is formed a recess of a cross shape or the like. At a formation time of the head part and especially at a formation working time of the recess, a large strain working is applied to a head apex part. For example, a two-stage punch header formation is performed. In this, first, it is pushed into a die by a preliminary upsetting punch to thereby perform a "primary formation" including an external shape of the head part of the screw, and subsequently by a finish upsetting punch there are simultaneously performed a formation of a final shape of the head part of a primary formed article in the die, and a formation of a concave part for screwing the screw by a driver, which is recessed like the cross shape or the like, in other words, an engaging groove.

In the formation like this, the bamboo nano-structure (refer to FIG. 4 mentioned later) of the head apex portion to which the large strain working is applied changes to the equiaxed nano-structure (refer to FIG. 5 mentioned later). On this occasion, as a worked material characteristic of the head apex part, it is necessary that a high ductility is possessed in order to perform a cold pressure production of the screw head part. Incidentally, after forming the head part, a thread part is formed by a form rolling, thereby making into the screw.

(2) Strength of Main Body of Formed Article and Strength of Specified Site

As mentioned above, in the formed article of an invention article of the present application, it is also a large characteristic that a strength is additionally increased in a specified site in regard to a main body portion. (A) It is desirable that "strength of the main body portion" is at least 230 with a Vickers hardness $H_V$ being made an index, and additionally it is more desirable that it is at least 250 with the Vickers hardness $H_V$ being made the index.

On the other hand, (B) it is desirable that "strength of the specified site" is respectively at least 300 with the Vickers hardness $H_V$ being made the index, while corresponding to the above main body portion, and it is more desirable that it is at least 351.

Incidentally, in the above, as to (A) "strength of the main body portion" and (B) "strength of the specified site", since the structures in respective regions exhibit the bamboo nano-structure and the equiaxed nano-structure, a conventional conversion value from the hardness $H_V$ to the tensile strength TS can not be necessarily applied. About this point, in a consideration of an embodiment 1 mentioned later, there is mentioned in a corresponding relation between the hardness $H_V$ and the tensile strength TS.

(3) Means for Giving Strength to Specified Site

Like this, means for more raising the strength of the specified site than the main body portion exists in achieving by that the equiaxed nano-structure is formed in this region and, for it, a forging working is applied to the portion concerned. On that occasion, as a working rate of the forging working, it is desirable that it is made at least 50% in an upsetting rate. And, actually, there is made one in which the upsetting rate is suitably, increasingly set while corresponding to a desired level of the mechanical property of the specified site.

Here, "upsetting rate" is made a proportion (% indication) of a decrease quantity of a length: L in a forged portion after the forging in regard to a length: $L_0$ of the portion concerned before the forging.

That is, the upsetting rate: X (%) is denoted by the following expression.

$$X=[(L_0-L)/L_0] \times 100$$

Figure 3:
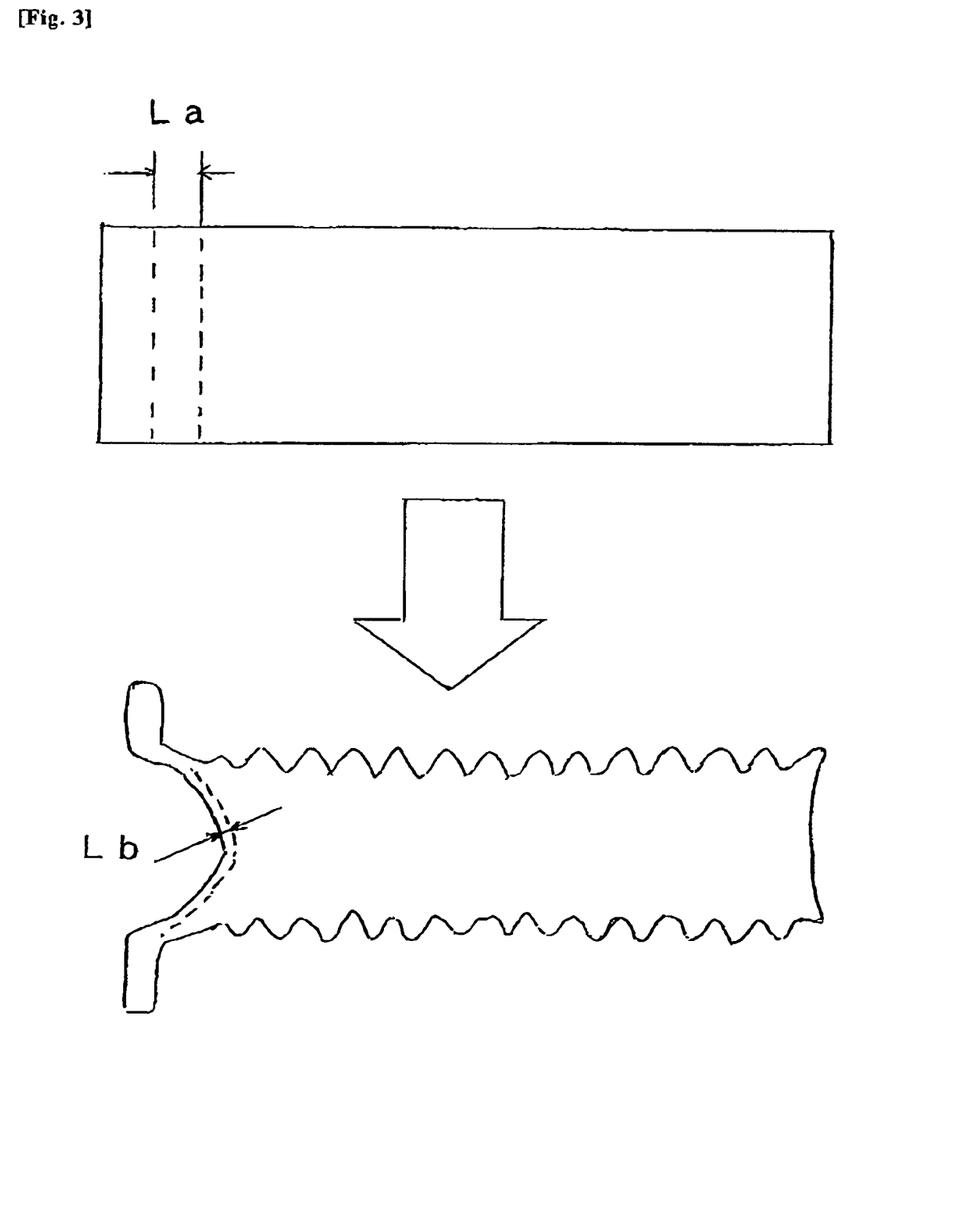
[FIG. 3] It is a view explaining about a deformation following upon a recess formation of a screw head part.

In the present invention, generally it is desirable that this upsetting rate: X is made at least 50% like the above. Further, in the formation of the screw apex part, or the like, as shown also in FIG. 3, if a length (thickness) of a portion for locally forming a recess of the screw head part is made La, and a length (thickness) in a recess bottom part after a deformation is made Lb, it is suitably considered that a local upsetting rate: $X_p$ in an upsetting working given to a bottom face and an inner periphery wall face part of a partial recess, which is denoted by the following expression $$X_p=[(La-Lb)/La] \times 100,$$

is made $X_p \geqq 95\%$, additionally $X_p \geqq 98\%$. And, about a local plastic strain ($\epsilon$) following upon a recess working on this occasion, it is effective and desirable that it is made at least 3.0.

Incidentally, strictly, although the plastic strain is one determined by a publicly-known three-dimensional limited element method, in a simple depressor working, it is approximately denoted by the following expression.

$$\epsilon=I_n[1-(L_0-L)/L_0]$$

In the present invention, if there is considered that it is one obeying a definition denoted by this expression and, about the $L_0$, L, there is considered as the above local change (from La to Lb) in compliance with a shape of the screw head part, there is made such that, in the recess working of the screw formation of the present invention, the local plastic strain $\epsilon$ given to the bottom face and the inner periphery wall face part of the recess becomes $\epsilon \geqq 3.0$, additionally $\epsilon \geqq 4.0$. A metal die of the recess working is designed so as to become the $\epsilon$ like this.

Incidentally, in a case where the screw is made an object, it can be considered that the $\epsilon$ is the same in an actual use level in the bottom face part and the inner periphery wall face part of the recess.

Figure 4:
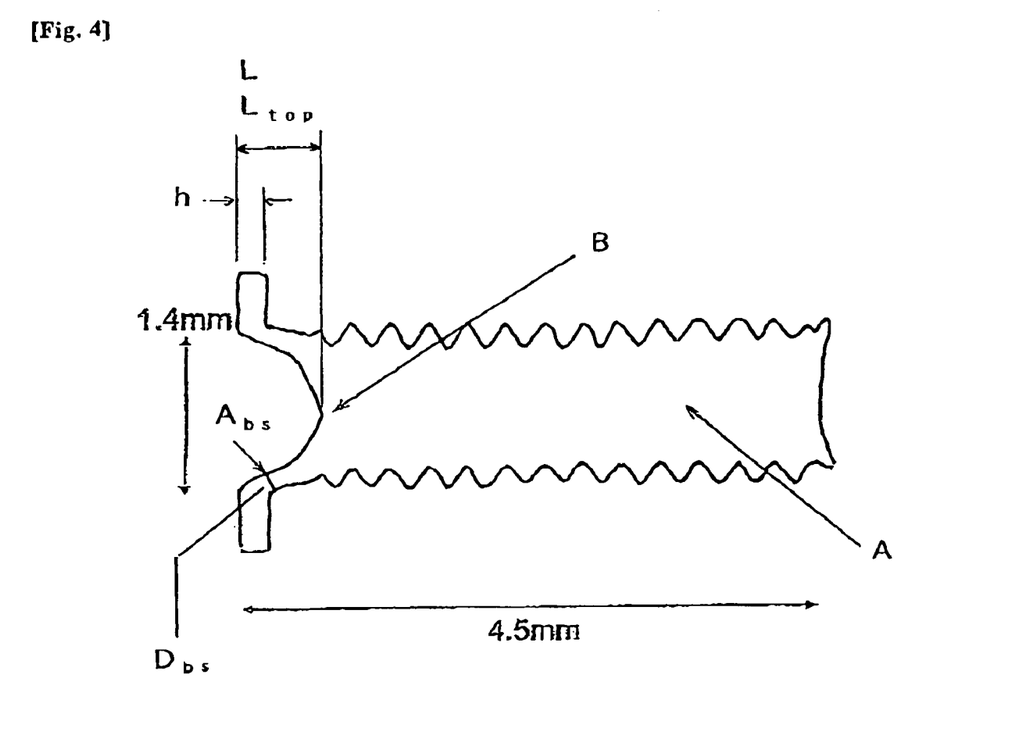
[FIG. 4] It is a view showing an enlarged section of a 3% vital etched face of a longitudinal section passing through an axis of a screw in an embodiment 1.

Additionally, in the recess working in the screw formation in the present invention, it is desirable that, as shown in FIG. 4, a ratio (R) between a depth ($L_{top}$) from an upper surface of the screw head part to a deepest point of the recess bottom face and a thickness (h) of the screw head part is made one denoted by the following expression.

$$R=L_{top}/h \geqq 2.5$$

Additionally, it is preferable that it is made $R \geqq 3.0$.

(4) Chemical Constituent Composition of Formed Article

As to a chemical constituent composition of the formed article, there suffices if a structure whose main phase is ferrite is formed as the metal structure of the formed article of the invention of the present application, and a second phase may exist as the balance and it may become the ferrite without the second phase. Here, the fact that the ferrite is a main body indicates that a volume proportion of the ferrite is at least 70%. This is because, if the mean grain diameter in the C-direction section in the bamboo nano-structure steel in which the proportion of the ferrite is at least this degree, the tensile strength TS becomes 1200 MPa or higher.

Since the formed article of the invention of the present application is manufactured with the wire rod or the steel wire being made the worked material, although the chemical constituent composition suffices if it is basically one in which it is in a constituent composition range used from olden times as the steel wire and the wire rod, and which satisfies the above condition, it is possible to suitably use one possessing the following characteristics.

A large characteristic in the chemical constituent composition of a characteristic of the formed article of the invention of the present application exists in the fact that, even if it is a cementite-free structure steel whose carbon content is 0.02 mass %, the above strength is ensured in the main body portion because it has the above-mentioned hyperfine grain structure. And, at a melt production time of a usual very low carbon steel, there suffices if it has a lowest limit chemical constituent composition required at a manufacturing time of a sound steel ingot or cast piece, although not impurities. Accordingly, it is sufficient with one which contains C: less than 0.02 mass %,
Si: 0.50 mass % or less,
Mn: 0.50 mass % or less, and
Al: 0.002-0.050 mass %,
and in which the balance comprises Fe and inevitable impurities.

Incidentally, as to the above contents of Si, Mn and Al, Si is allowed up to 0.50 mass % and Mn up to 0.50 mass % as deoxidation elements for suppressing a content of oxygen (O) among the following inevitable impurities to at least 0.01 mass % or less by considering with a melt production process by a deoxidation method other than a usual vacuum deoxidation being included and, as to Al, it is required to be contained in a range of 0.002-0.050 mass %.

Further, although a content of the inevitable impurity element is not prescribed especially, from a necessity for obtaining the formed article of a high strength and a high ductility, it is desirable that a content of P is 0.025 mass % or less because it decreases a workability, and a content of S 0.015 mass % or less because it decreases a corrosion resistance and the workability. Further, although O (oxygen) is also the inevitable impurity contained in the steel, the deoxidation must be sufficiently performed in a melt production step because, if it is contained in a large quantity, the corrosion resistance and the workability decrease. It is desirable that a content of O is made 0.010 mass % or less.

EMBODIMENTS

The invention of the present application is additionally, detailedly explained by embodiments. Hereafter, there are mentioned about an embodiment 1 and an embodiment 2, which exist in a scope of the invention of the present application, and a comparative example 1 which exists in an outside of the scope of the invention of the present application.

Embodiment 1

A steel of constituent No. 1 having a chemical constituent composition shown in Table 1 was melt-produced by using a vacuum melting furnace, and cast to a steel ingot.

TABLE 1

| Constituent No. | C | Si | Mn | P | S | N | sol. Al |
|---|---|---|---|---|---|---|---|
| | | | | | | | Unit: mass % |
| 1 | 0.0047 | 0.30 | 0.20 | 0.009 | 0.001 | 0.0024 | 0.026 |

The steel ingot obtained was formed to a steel bar of 12 mm φ by a hot forging. From this, a raw material for a warm rolling was taken, and it was formed to 6 mm φ by a multi-pass caliber rolling in a multi-direction in the warm and water-cooled, thereby preparing the wire rod. A condition of this warm rolling is one in which it was rolled to 6 mm φ in a range of a rolling temperature of 450-530° C. after being heated to 550° C. During this, a depressor direction was changed by rotating, in every pass of the rolling, the material about a longitudinal direction axis, and thereby the multi-pass rolling in the multi-direction was performed. The total area reduction rate R from 12 mm φ to 6 mm φ in this warm rolling is 75%. At this time, a true strain c calculated from the following expression (1) is 1.39. Incidentally, by an effect of the multi-direction rolling, at least 2 is inputted as the plastic strain ε.

$$e = -\ln(1 - R/100) \ldots \quad (1)$$

Where, R is the total area reduction rate R denoted by the following expression (2):

$$R(\%) = \{(S_0 - S)/S_0\} \times 100 \ldots \quad (2)$$

where, R: total area reduction rate (%) applied to material
$S_0$: C-direction sectional area of material just before warm working commencement
S: C-direction sectional area of material, which is obtained after warm working finish.

And, a mean ferrite grain diameter of the wire rod of 6 mm φ, which was warm-rolled, became 0.5 μm in the C-direction section.

Next, the wire material of 6 mm φ prepared by the warm rolling was prepared to a steel wire of wire diameter 1.15 mm φ by a cold wire drawing and a strain relief annealing. Incidentally, a wire drawing rate at this time is 96.3% and a mean plastic strain ε at this time is ε=3.30.

And, a metal structure exhibited the bamboo structure. Further, the ferrite mean grain diameter was 105 nm in the C-direction section.

Further, as to the mechanical properties of the steel wire obtained, the tensile strength TS was 1053 MPa, and the reduction of area RA was 77.6%. Like this, it became the steel wire whose strength is considerably high, and whose ductility is remarkably excellent.

Next, from the steel wire of 1.15 mm φ, there was formed a thin head small screw of M 1.4 (nominal diameter 1.4 mm), which had a cross hole (cross recess). A method of forming it was performed by a process of forming the head part by the so-called two-stage punch header (double header) explained in the implementation mode, and subsequently forming the thread part by a form rolling working. Here, the upsetting rate at a head part formation time was 68%.

As to the small screw obtained by doing like this, a property and performance qualification test was performed. Its results are as follows.

In FIG. 4, there is shown an enlarged sectional view of a 3% nital etched face in a longitudinal section passing through an axis of the screw. According to this, in the formed screw, an outer diameter of a thread part is 1.4 mm, a thickness (h) of the head part 0.22 mm, and the depth ($L_{top}$) from the upper surface of the screw head part to the deepest point of the recess bottom face is 0.66 mm. And, a ratio (R) to the thickness (h) of the head part is R=0.66/0.22=3.

Further, a site of a thinnest wall thickness part of an engaging groove of the head part is a portion between a smallest diameter circumference part of a seat face and an engaging groove inner face approaching the former, and a thickness (denoted by $D_{bs}$) of the site concerned is 0.133 mm.

Figure 5:
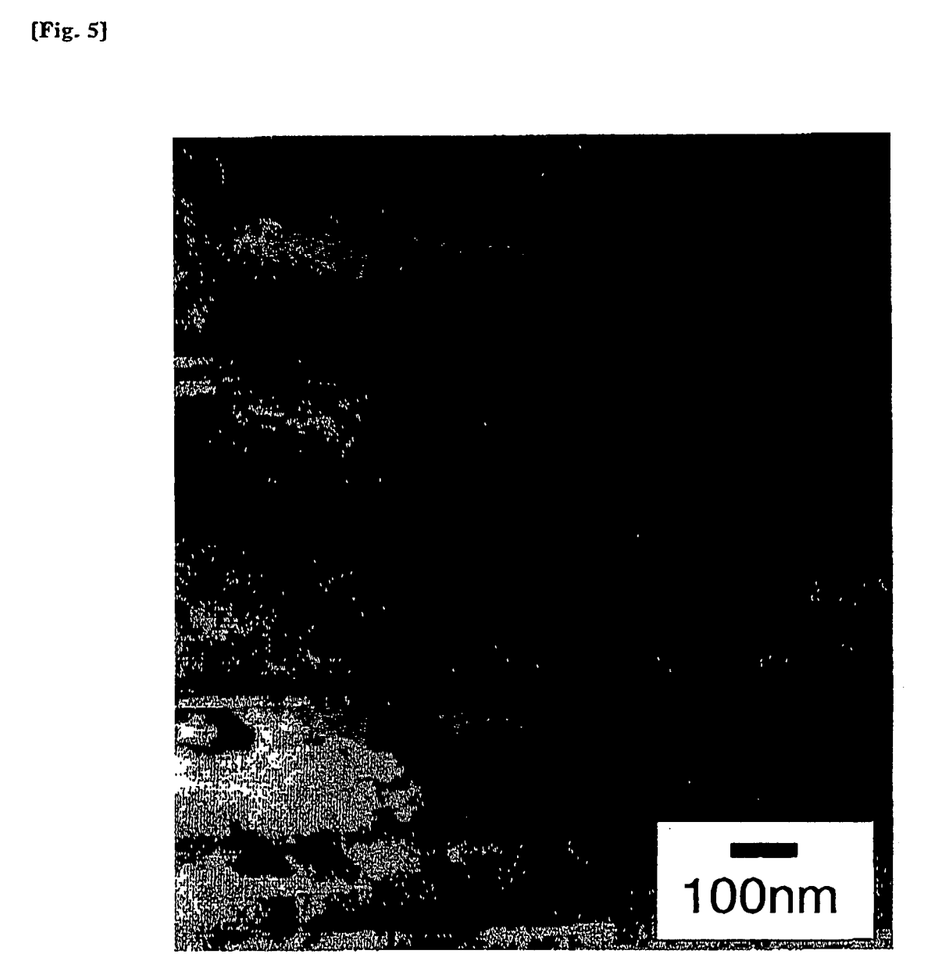
[FIG. 5] It is a view of a TEM photograph exemplifying a bamboo nano-structure in a portion shown by an arrow A in FIG. 3, within a longitudinal section of a shaft part main body of the screw in the embodiment 1.

And, in FIG. 5, there is shown a TEM (Transmission Electron Microscopy) photograph of the metal structure of a portion shown by an arrow A in FIG. 4, within a longitudinal section of a shaft part main body of this screw. As understood from the same drawing, in a portion of the shaft part main body, there is exhibited the bamboo structure elongated in an axis direction (wire drawing direction), and the mean grain diameter of a section structure perpendicular to the former was 98 nm. This becomes the bamboo nano-structure comprising the ferrite. And, the Vickers hardness $H_v$ of an axis part was 286-289.

Incidentally, here, according to the above results, although it is considered that $H_v$286-289 in the bamboo nano-structure approximately corresponds to L-direction TS=1053 MPa, according to an approximate tensile strength TS appended in "Hardness Conversion Table" of SAE J 417 as a general correspondence relation between $H_v$ and TS, $H_v$=286 and 289 approximately correspond to TS=905 and 915 MPa, so that there is a large difference. Like this, the correspondence relation between hardness $H_v$ and the tensile strength TS in the bamboo nano-structure is peculiar, and it is impossible to simply convert the tensile strength TS from the hardness $H_v$.

Figure 6:
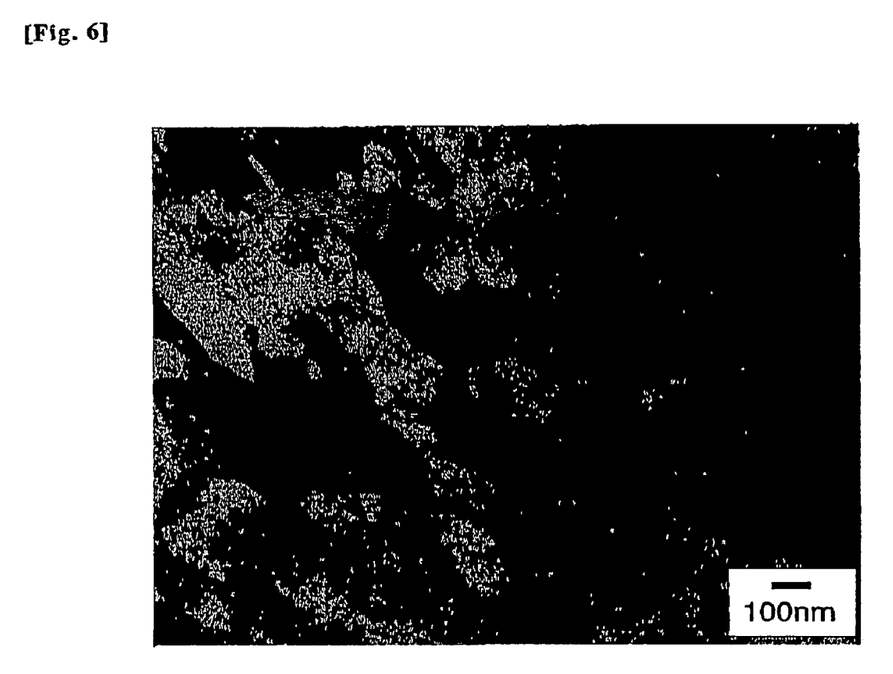
[FIG. 6] It is a view of a TEM photograph exemplifying an equiaxed nano-structure in a portion shown by an arrow B in FIG. 3, in a longitudinal section of an engaging groove of a screw bead part in the embodiment 1.

On the other hand, in FIG. 6, there is shown a TEM photograph of the metal structure of a portion shown by an arrow B in FIG. 4, in a longitudinal section of the engaging groove of the screw, which was formation-worked by the two-stage punch header (double header) of the screw. As understood from the same drawing, in this portion, it is changed to the equiaxed structure. And, the mean grain diameter of this portion was 100 nm. This becomes the equiaxed nano-structure comprising the ferrite. And, the Vickers hardness $H_v$ in a vicinity of this region was 374 and 379. This remarkably raised in comparison with the above shaft part main body. It is inferred that a local upsetting rate $X_p$ of this portion, in which there is changed to the equiaxed structure by the formation working in the two-stage punch header and $H_v$ shows 374 and 379, is at least 95%, and a local plastic strain $\epsilon$ is at least 3.0.

Incidentally, from the above results, although the correspondence relation between the high level hardness $H_v$=374 and 379 in the equiaxed nano-structure and the tensile strength TS cannot be considered, at least by the change from the bamboo nano-structure to the equiaxed nano-structure, there is inferred the fact that the anisotropy in the material characteristic was greatly improved.

Further, the Vickers hardness $H_v$ of a site adjoining a portion $A_{bs}$ between the smallest diameter circumference part of the seat face and the engaging groove inner face approaching the former became 307-334. Also this remarkably rises than the Vickers hardness $H_v$ (286-289) of the axis part.

From the above results, the fact became clear that, at a formation time of the engaging groove of the screw head part, the bamboo nano-structure of the formed material changed to the equiaxed nano-structure and the strength of the engaging groove was greatly raised.

Comparison Test of Embodiment 2 and Comparative Example 1

Although while the embodiment 2 is one existing in the scope of the invention of the present application, the comparative example 1 is one existing in the outside of the scope of the invention of the present application, in each of both, it is an M 1.6 small screw whose shaft diameter is 1.6 mm $\phi$ and which has the cross hole (cross recess), and a head part shape/dimension, a cross bole shape/dimension, a pitch of the thread and other thread part shape/dimension are the same. That shape/dimension was made an M 1.6 of JIS B0251.

About both of them, a comparison test of recess strength was performed. Manufacturing conditions of the embodiment 2 and the comparative example 1 are as follows.

Embodiment 2

A steel of the constituent No. 1 having the same chemical constituent composition as the embodiment 1, which is shown in Table 1, was melt-produced by using a vacuum melting furnace, and cast to a steel ingot. The steel ingot obtained was formed to a steel bar of 12 mm $\phi$ by the same hot forging conditions as the embodiment 1. Subsequently, it was rolled to 6 mm $\phi$ by the warm rolling conditions conforming to the embodiment 1, and a wire rod was prepared. The mean ferrite grain diameter of the wire rod of 6 mm $\phi$ obtained by this warm rolling became 0.5 μm in the C-direction section.

Next, the wire rod of 6 mm $\phi$ prepared by the above warm rolling was prepared to a steel wire of 1.3 mm $\phi$ in wire diameter by the cold rolling and the wire drawing. Incidentally, the area reduction rate at this time is 95.3%. The metal structure of the steel wire exhibited the bamboo structure. Further, the ferrite mean grain diameter was 100 nm in the C-direction section. In this wire drawing process, it was unnecessary at all to perform an annealing in a midway, As to the mechanical properties of the rolled finish steel wire obtained by doing like this, the tensile strength TS was 1014 MPa, and the reduction of area RA 79.5%. Like this, it was the steel wire having a high strength and a very high ductility.

Subsequently, from the steel wire of 1.3 mm $\phi$, it was formed to the small screw with the cross bole (cross recess) of M 1.6 (nominal diameter 1.6 mm). A method of forming it was performed while conforming to the embodiment 1 by the process of forming the head part by the two-stage punch header (double header), and subsequently forming the thread part by the form rolling working. Here, the upsetting rate at the bead part formation time was 70%.

Comparative Example 1

A commercial steel wire, which was a steel wire JIS SWCH16A for cold rolling, of 1.6 mm in wire diameter and had a chemical constituent composition shown in Table 2 (constituent No. 2), and in which the wire rod was subjected to a spheroidizing annealing after the cold wire drawing and additionally finished by the cold wire drawing, was formed to the small screw of M 1.6 (nominal diameter 1.6 mm), which had the cross bole (cross recess), by the formation method which was the same in the embodiment 2. Subsequently, it was finished by applying a carburization hardening/tempering treatment to it.

TABLE 2

| Constituent No. | C | Si | Mn | P | S | sol. Al |
|---|---|---|---|---|---|---|
| | | | | | | Unit: mass % |
| 2 | 0.16 | 0.04 | 0.74 | 0.005 | 0.008 | 0.030 |

Comparison Test in Recess Strength of Embodiment 2 and Comparative Example 1

About each small screw of the embodiment 2 and the comparative example 1, which was prepared in conformity with the above, there was performed a strength test of the cross hole (recess). In the recess strength test, there was judged by a torque value till a torque load became not being applied to the screw while depending on whether the cross hole is deformed or destroyed when a turning force was given by fitting a driver to the engaging groove. In a test method, a maximum torque value, when a torque load was applied at a number of revolutions: 5 rpm and a thrust: 1 kgf by fixing the head part of the screw by a vise and fitting the driver to the engaging groove, was measured from a chart.

As a result, the maximum torque value in the embodiment 2 was 4.05 kgf·cm, and the maximum torque value in the comparative example 1 was 3.17 kgf·cm.

Like this, there was confirmed the fact that rather the screw of the embodiment 2 was remarkably excellent in its recess strength than the screw of the comparative example 1, which was highly strengthened by a conventional surface hardening method by the carburization.

Embodiment 3

Similarly to the embodiments 1 and 2, one having the chemical constituent composition of the constituent No. 1 shown in Table 1 was melt-produced by using the vacuum melting furnace and cast to a steel ingot. The steel ingot obtained was formed to a steel bar of 80 mm square by the hot forging. A raw material for rolling was taken from each of the steel bar of 80 mm square, and it was formed to 18 mm square by the multi-direction multi-pass caliber rolling in the warm, thereby preparing a steel bar by being water-cooled. A temperature of this warm rolling is in a range of 450-530° C., and the total area reduction rate is 94.9%. Incidentally, the grain diameter in the C-direction section of the steel bar of 80 mm square, which was prepared by the warm rolling, was equalized over its whole face.

Next, the steel bar of 18 mm square was diameter-reduced by a cutting working, and worked to a wire rod of diameter 6.0 mm φ. The tensile strength TS of this wire rod was 665 MPa, the reduction of area RA 80.0% and the Vickers hardness Hv 226, and the mean ferrite grain diameter became 0.8 μm in the C-direction section.

Next, the wire rod of 6 mm φ, which was prepared by the above warm rolling, was prepared to a steel wire of 1.3 mm φ in wire diameter by the cold wire drawing. Incidentally, the wire drawing rate at this time was 95.3%, and the metal structure of the steel wire exhibited the bamboo structure. The ferrite mean grain diameter was 150 nm in the C-direction section. In this wire drawing process, there was unnecessary at all to perform a softening annealing in a midway.

As to the mechanical properties of the wire-drawn finish steel wire obtained by doing like this, the tensile strength TS was 1419 MPa, the reduction of area RA 70.2%, and the Vickers hardness HV 334. Like this, it was the steel wire having a high strength and a very high ductility.

Subsequently, from the steel wire of 1.3 mm φ, it was formed to the small screw with the cross hole (cross recess) of M 1.6 (nominal diameter 1.6 mm). A method of forming it was performed similarly to the embodiment 2 by the process of forming the head part by the two-stage punch header (double header), and subsequently forming the thread part by the form rolling working. Here, the upsetting rate at the head part formation time is also 70% that is the same as the embodiment 2.

A torsion rupture torque of the obtained small screw of M 1.6 was measured. As a result, the torsion rupture torque in the embodiment 3 was 3.07 kgf·cm. On the other hand, as a result of performing the same test also in the above-mentioned screw (the small screw of M 1.6 of the same shape/dimension, which was prepared from SWCH16A, and to which the carburization hardening/tempering treatment was applied) of the comparative example 1, the torsion rupture torque was 3.01 kgf·cm.

Figure 7:
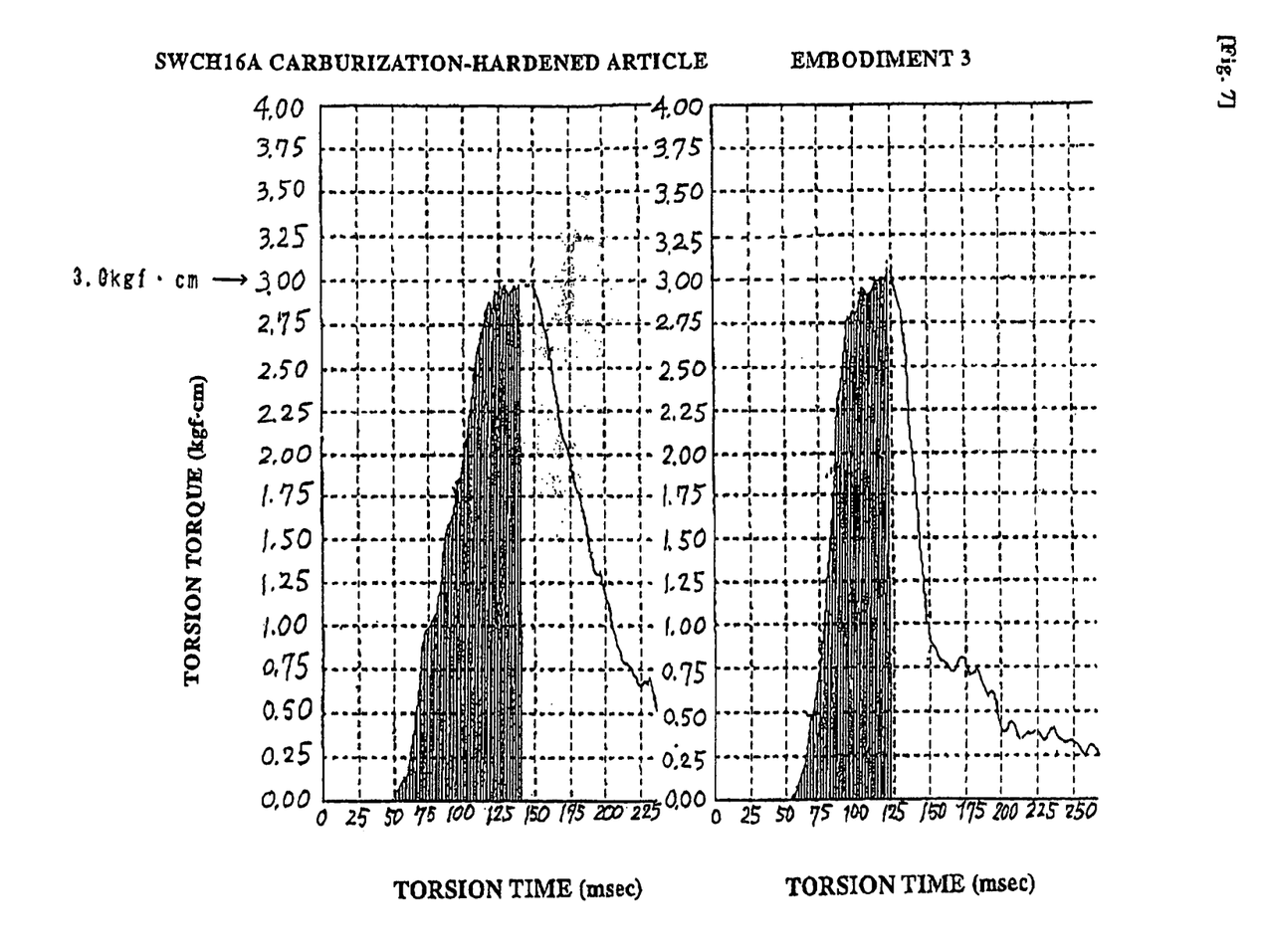
[FIG. 7] It is a view showing examples of charts showing respective behaviors in torsion torque of a comparative example 1 (SWCH16A carburization-hardened article) and an embodiment 3, in a torsion rupture strength test of an M 1.6 small screw.

Like this, a torsion rupture strength of the M 1.6 small screw of the embodiment 3 is in an excellent level equivalent to the torsion rupture strength of the M 1.6 small screw, of a conventional material, treated by the carburization hardening/tempering. In FIG. 7, there are shown examples of charts showing respective behaviors in torsion torque of the comparative example 1 (SWCH16A carburization-hardened article) and the embodiment 3 in the torsion rupture test.

Incidentally, in the respective embodiments mentioned above, although there were exemplified about ones in which the nominal diameter of the screw is 1.4 mm (M 1.4) and 1.6 mm (M 1.6), by the present invention it is possible to manufacture a screw whose nominal diameter is additionally small, e.g., a micro screw such as M 1.0 or smaller or M 0.8. Further, there is easily inferred also a superiority in recess strength of the screw comprising the shaft main body part of the bamboo nano-structure and an engaging groove part surface layer part of the equiaxed nano-structure.

INDUSTRIAL APPLICABILITY

Since the invention of the present has the constitution as mentioned above, next advantages are brought about.

Before everything, first, (1) in regard to the formed article concerned with the invention of the present invention, since the main body of the formed article is constituted by the bamboo nano-structure and, moreover, the equiaxed nano-structure is formed in a desired place of this main body by a necessary depth, there is obtained a formed article in which not only the strength of the formed article main body is remarkably excellent but also, in regard only to the above limited one portion of the main body, there is desired an existence of a region excellent in such mechanical properties that the strength is high and moreover the anisotropy is extremely small, e.g., one which, although it is a small size hitherto not realized in the screw especially in the micro screw, has a high strength equivalent to the conventional size or higher than it.

Next, (2) in relation to the manufacturing process of the above excellent formed article, in the process of manufacturing the wire rod or the steel wire, which is the raw material of the formed article, by the cold working, since a start material of this raw material already possesses the high strength and the high ductility by the fine grain steel of the sub-micron order, even if it is a material of the chemical constituent composition generating the cementite, a heat treatment, such as spheroidizing annealing, for softening the material, and the like are not indispensable, and the cold rolling can be performed till a desired wire diameter. Accordingly, it contributes to the energy conservation and an environmental preservation. Further, it is unnecessary to necessarily add a so-called alloy element to the chemical constituent composition of the steel in order to raise the strength.

Further, (3) since the crystal structure of the formed article as formation-worked intact exhibits such bamboo nano-structure and equiaxed nano-structure as mentioned above, there is given the high strength, and a ductility level is secured as well. Accordingly, it is unnecessary to apply a refining treatment such as hardening/tempering to the formation-worked article.

Additionally, (4) by applying the forging working only to the necessary surface layer part of the formed article main body, it is possible to more remarkably raise the strength of only that portion. According to a surface hardening treatment of the formed article in the prior art, by the carburization hardening/tempering, a nitriding treatment, a liquid carburization nitriding treatment, a high frequency hardening/tempering or a flame hardening/tempering for instance, although there is a case where this is difficult in a case where a place to be surface-hardening-treated is limited to one part of the formed article or a case where it is desired to control a hardened depth, these are easily achieved by the method of the invention of the present application.

Like the above, according to the invention of the present application, various advantages are brought about and, therefore, it is possible to provide a high strength formed article comprising the hyperfine grain structure steel, which can contribute also to a simplification of the manufacturing process, a reduction in cost, the conservation of natural resources and a recycle of natural resources, and a manufacturing method of the same, so that there is brought about an industrially, extremely beneficial advantage.

DESCRIPTION OF REFERENCE NUMERALS 1 steel wire
2 preliminary upsetting punch (first punch)
3 die
4 finish upsetting punch (second punch)
5 intermediate formed article of screw (in die)
6 head part
7 recess of cross shape or the like
8 schematic perspective view of intermediate formed article of screw

The invention claimed is:

1. A screw component comprising a hyperfine grain structure steel, the screw component having a shaft part and a head part, the head part having a recess formed therein, wherein a structure of a surface layer part of a bottom part of the recess is an equiaxed structure whose mean grain diameter is 200 nm or smaller, wherein a structure of the shaft part is a bamboo structure whose mean grain diameter in a section structure perpendicular to a longitudinal direction is 200 nm or smaller, wherein a hardness of a region in which the equiaxed structure is formed is 300 or higher in a Vickers hardness, wherein a hardness of a region in which the bamboo structure is formed is 230 or higher in a Vickers hardness, and wherein the screw component is 1.4 mm or smaller in a nominal diameter.

2. A screw component according to claim 1, wherein the hardness of the region in which the equiaxed structure is formed is 350 or higher in a Vickers hardness, and the hardness of the region in which the bamboo structure is formed is 250 or higher in a Vickers hardness.

3. A screw component according to claim 1, wherein the screw component contains a following chemical constituent composition:
C: less than 0.02 mass %,
Si: 0.50 mass % or less,
Mn: 0.50 mass % or less, and
Al: 0.002-0.05 mass %,
and the balance comprises Fe and inevitable impurities.

4. A screw component according to claim 2, wherein the screw component contains a following chemical constituent composition:
C: less than 0.02 mass %,
Si: 0.50 mass % or less,
Mn: 0.50 mass % or less, and
Al: 0.002-0.05 mass %,
and the balance comprises Fe and inevitable impurities.

* * * * *